(12) United States Patent
Zamora Cura

(10) Patent No.: US 8,407,340 B2
(45) Date of Patent: Mar. 26, 2013

(54) PAGE LOAD PERFORMANCE ANALYSIS

(75) Inventor: Carlos A. Zamora Cura, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 453 days.

(21) Appl. No.: 12/757,868

(22) Filed: Apr. 9, 2010

(65) Prior Publication Data

US 2011/0249871 A1 Oct. 13, 2011

(51) Int. Cl.
*G06F 15/173* (2006.01)
(52) U.S. Cl. ......................... 709/224; 382/113
(58) Field of Classification Search .................. 709/224; 282/113
See application file for complete search history.

(56) References Cited

U.S. PATENT DOCUMENTS

| | | | | |
|---|---|---|---|---|
| 5,732,218 | A * | 3/1998 | Bland et al. ................. | 709/224 |
| 5,784,557 | A * | 7/1998 | Oprescu ...................... | 709/220 |
| 6,446,028 | B1 * | 9/2002 | Wang ........................... | 702/186 |
| 6,633,886 | B1 * | 10/2003 | Chong ......................... | 707/798 |
| 6,792,460 | B2 * | 9/2004 | Oulu et al. ................... | 709/224 |
| 6,976,210 | B1 * | 12/2005 | Silva et al. .................. | 715/205 |
| 7,231,606 | B2 | 6/2007 | Miller et al. | |
| 7,330,887 | B1 | 2/2008 | Dharmadhikari | |
| 7,379,427 | B2 | 5/2008 | Boss et al. | |
| 7,600,014 | B2 | 10/2009 | Russell et al. | |
| 7,937,470 | B2 * | 5/2011 | Curley et al. ............... | 709/226 |
| 8,135,829 | B2 * | 3/2012 | Klein et al. ................. | 709/224 |
| 2004/0012625 | A1 * | 1/2004 | Lei et al. .................... | 345/738 |
| 2008/0139191 | A1 * | 6/2008 | Melnyk et al. ............. | 455/419 |
| 2009/0164629 | A1 | 6/2009 | Klein et al. | |

FOREIGN PATENT DOCUMENTS

WO WO 9415305 * 7/1994

OTHER PUBLICATIONS

What is Firebug? : Firebug—Published Date: Jan. 15, 2010 http://getfirebug.com/whatisfirebug (4 pages).
Page loading profiling tools | Wim Leers—Published Date: Aug. 24, 2009 http://wimleers.com/article/page-loading-profiling-tools (6 pages).
Features of WSOP—Published Date: 2008 http://www.web-site-test.com/features.shtml (3 pages).
Load Time Analyzer :: Add-ons for Firefox—Published Date: Sep. 18, 2006 https://addons.mozilla.org/en-US/firefox/addon/3371 (2 pages).
Measuring Load Time for a Web Page—Published Date: Aug. 22, 2005 http://technet.microsoft.com/en-us/library/cc778898%28WS.10%29.aspx (1 pages).
Measure web page performance with YSlow—Published Date: Jan. 28 2009 http://blogs.microsoft.co.il/blogs/yevgenif/archive/2009/01/28/measure-web-page-performance-with-yslow.aspx (3 pages).
Episodes: a Framework for Measuring Web Page Load Times—Published Date: Jul. 2008 http://stevesouders.com/episodes/paper.php (10 pages).
6 Tools to Find Out Website Load Speed—Published Date: Nov. 5, 2009 http://www.cyberciti.biz/tips/website-load-speed-performace-testing-tools.html (10 pages).

* cited by examiner

*Primary Examiner* — Krisna Lim
(74) *Attorney, Agent, or Firm* — Workman Nydegger

(57) ABSTRACT

Page load time analysis. The analysis may allow a web page designer to determine improvements that could be made to the web page to decrease load time, and perhaps identify the modules or components that are critical paths in decreasing page load time. The analysis is performed based on the monitoring of multiple requests associated with a page request. The user may be notified of the graph or the results of analysis of the graph. The user may then determine whether the page load time can be improved.

20 Claims, 5 Drawing Sheets

PAGE LOAD PERFORMANCE ANALYSIS

BACKGROUND

In the standard Internet topology, a client requests a web page from a server, whereupon the server downloads the web page to the client. The browser of the client then renders the web page. As web pages have become more complex, this process has become more complicated than just a simple single request and response. Rather a single web page might be loaded in response to many requests issued by the client.

The loading of complex web pages are initiated by the client which requests the main web page that acts as a page template. Then, the browser requests further components that may be used to populate the page template. Such components may be images, sound files, embedded content, script files that are used to generate dynamic content, and the like. In general, the response to the main web page spawns one or more follow-up requests. The response to each of these requests may spawn zero, one, or more follow-up requests. This continues until there are no further requests to be made because the page template is fully downloaded. For complex web pages, it can take a significant number of requests before all of the components of the page are loaded.

An important performance parameter for web pages is the page load time, which is the amount of time it takes from the time that the client makes the initial request for a web page to the time that the client's browser finally renders all of the web page. For complex web pages, the page load time can be noticeable to the user of the client due to the large number of requests used to obtain the page. If the load time is great enough, the user might even consider the web page to load slowly. Accordingly, the faster the load time, the more responsive and accessible the web page seems.

BRIEF SUMMARY

At least one embodiment described herein relates to the analysis of page load time. The analysis may allow a web page designer to determine improvements that could be made to the web page to decrease load time, and perhaps identify the modules or components that are critical to decreasing page load time.

The analysis is performed based on the monitoring of multiple requests associated with a page request. For instance, there might be a request for a main page that acts as a template, and one or more follow-up requests for static or dynamic content that populates the template to formulate a more complex page. For each of at least some, and perhaps all, of the multiple requests associated with the page request, a time interval for the request is determined. The interval might be defined by the detection of the start of the request, and the completion time of the request as the ending point. The intervals may then be evaluated to form an directed acyclic graph of the multiple requests where the root is the first request and the destination is the request acting as the page beacon. This graph may be evaluated to determine if there are one or more critical path requests that are taking an inordinately long time to complete.

The analyst or programmer may be notified of the graph or the results of analysis of the graph. Only those page requests in the critical path between the root and beacon nodes matter in order to decrease the page load time (of course there is a point where page modifications may change the critical path in the page, but then that may be considered as a new scenario). By the same token, as long as this critical path is not increased the page load time will not increase.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, page load time is analyzed. The analysis may allow a web page designer to determine improvements that could be made to the web page to decrease load time, and identify the modules or components that are part of the critical path thus allowing to the identification of meaningful changes to the page that may decrease the page load time. The analysis is performed based on the monitoring of requests associated with a page request. The user may be notified of the graph or the results of analysis of the graph. The user may then determine whether the page load time can be improved. First, some introductory discussion regarding computing systems will be described with respect to FIG. 1. Then, embodiments of page load time will be described with respect to FIGS. 2 through 6.

Figure 1:
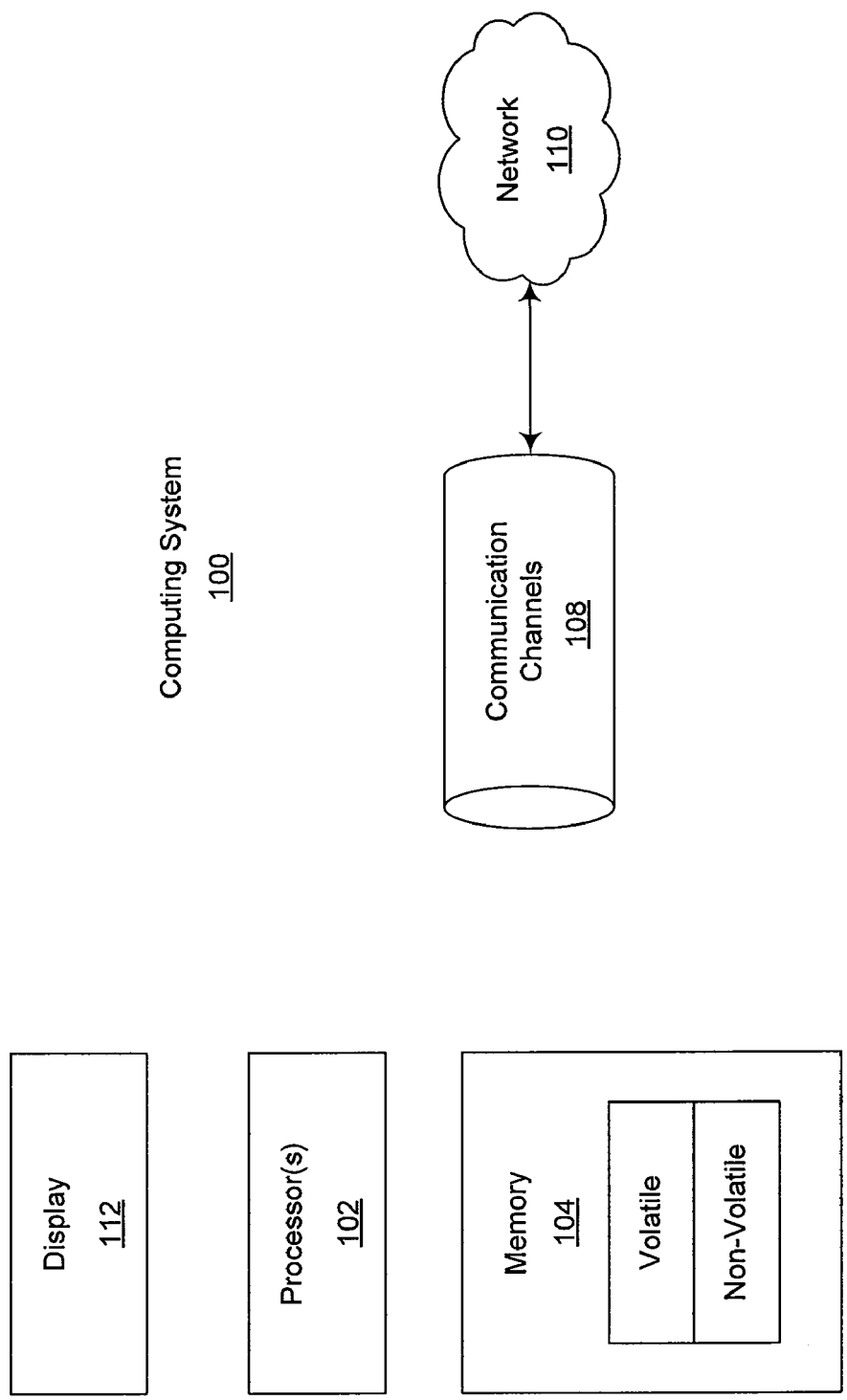
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. The computing system 100 also may include a display 112 that may be used to provide various concrete user interfaces, such as those described herein.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and includes any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include a computer program product having computer-readable media for carrying or having computer-executable instructions or data structures stored thereon. Such computer-readable media (or machine-readable media) can be any available media that can be accessed by a general purpose or special purpose computer. By way of example, and not limitation, such computer-readable media can comprise physical non-transitory storage and/or memory media such as RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. The computer-executable instructions cause the computer or processing device to perform the function or group of functions because the computer-executable instructions have a certain structure. If digitally represented, for example, such structures may represent one or more bits of information. In the case of magnetic storage media, for example, such as structure may be a level and/or orientation of magnetism on the media at predetermined parts of the magnetic storage media. In the case of optical storage media, for example, such a structure may be a level of reflectivity of the media at particular predetermined parts of the optical media.

Figure 2:
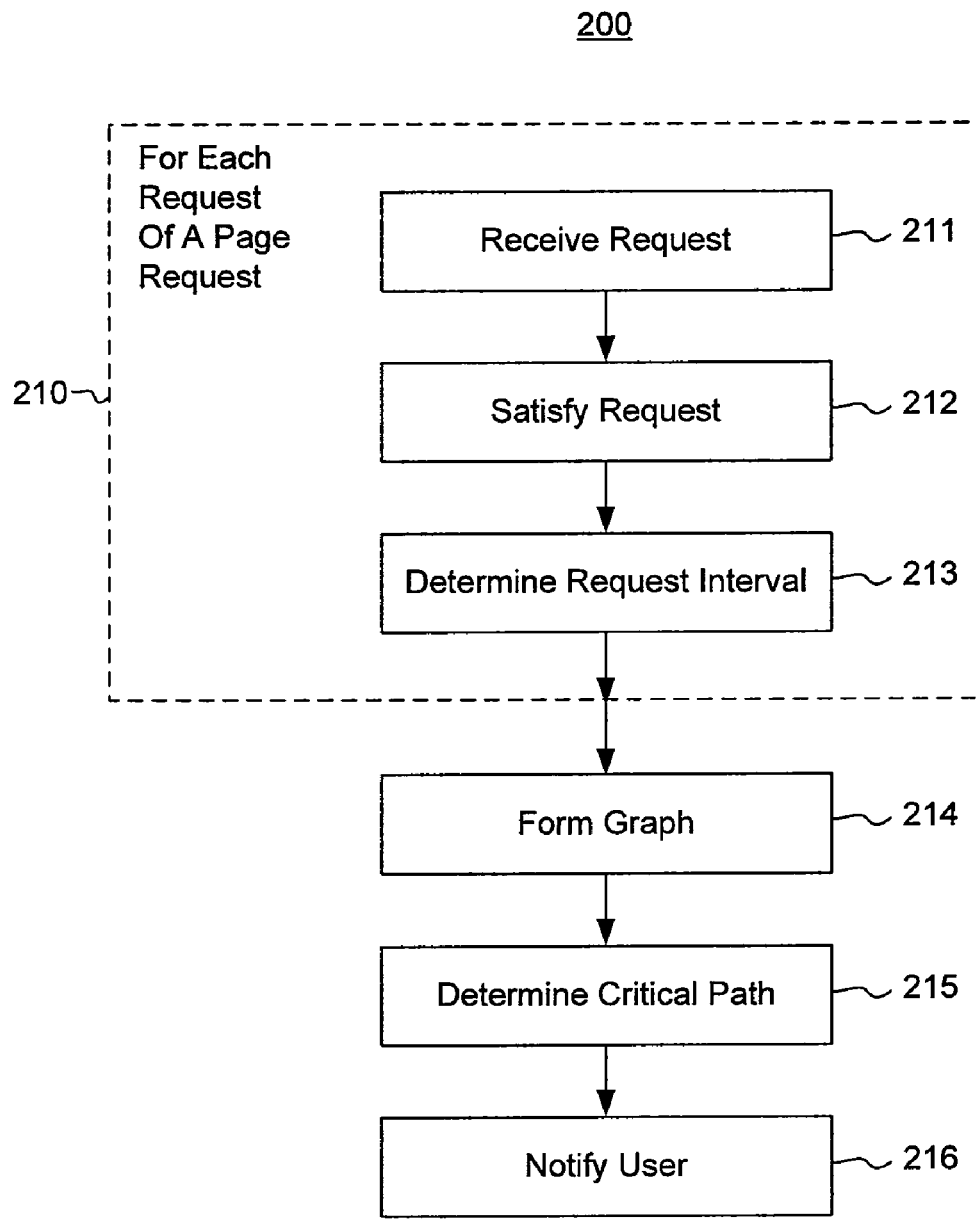
FIG. 2 illustrates a flowchart of a method for analyzing page load time.

FIG. 2 illustrates a flowchart of a method 200 for analyzing page load time. The method 200 may be performed, for example, at the direction of a computing system 100, once the computing system has been structurally modified to include one or more computer-executable instructions that are structured such that, when executed by one or more processors of the computing system, cause the computing system to perform the method 200. As an example, the computing system may be the computing system 100 of FIG. 1, and the one or more computer-readable media might include for example, the memory of the computing system being structurally modified to include appropriate voltage levels suitable to represent the computer-executable instructions, or a hard drive of the computing system structurally modified to include appropriate magnetism levels suitable to represent the computer-executable instructions, or an optical drive of the computing system structurally modified to include appropriate optical properties to represent the computer-executable instructions.

Figure 3:
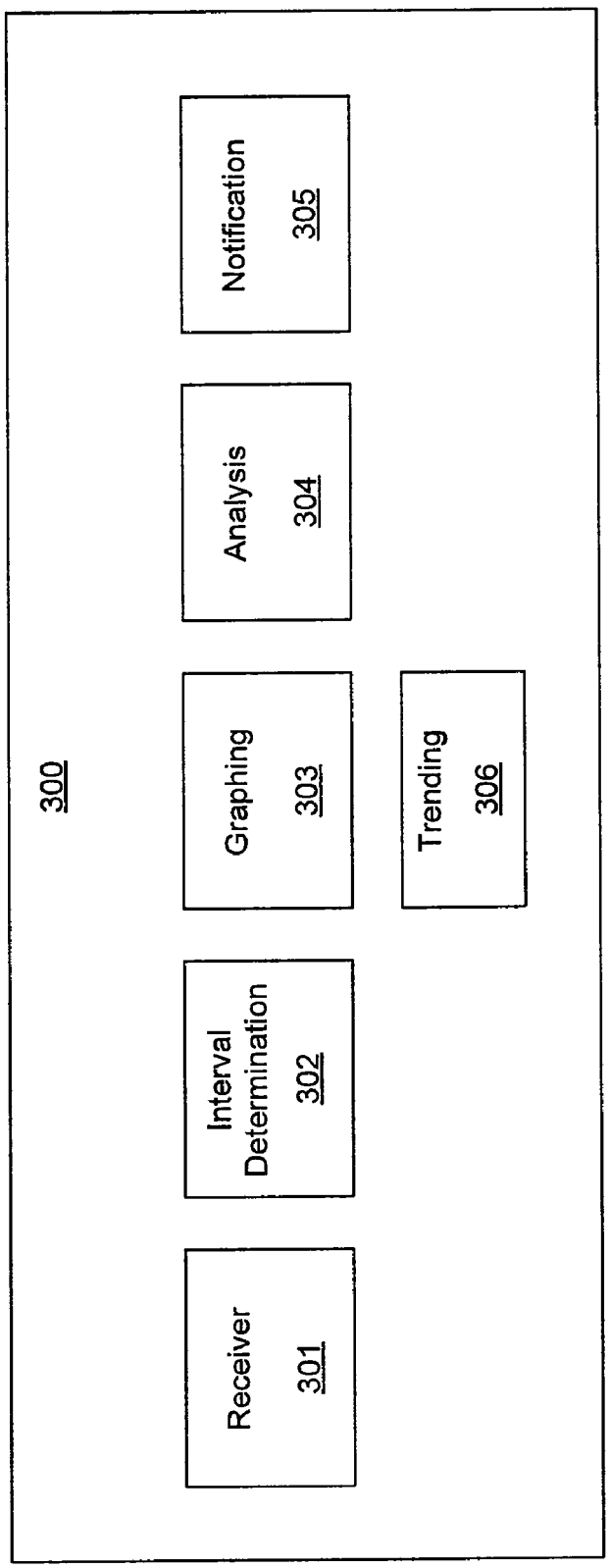
FIG. 3 illustrates an example structure for implementing the method of FIG. 2.

FIG. 3 illustrates an example structure 300 for implementing the method 200. The structure 300 includes a receiver component 301, an interval determination component 302, a graphic component 303, an analysis component 304, a notification component 305, and a trending component 306. Each of these components is structured to perform a particular task of the method 200 as will be described further below.

Recall that a single page request might result in numerous associated requests including 1) the original page request that results in the main page template, and 2) a number of follow-on requests that result in static and dynamic content being downloaded to the client to thereby populate the template. The method 200 includes several acts that are repeated for each of at least some of the requests associated with a particular page request. The acts that are performed for each request associated with a particular page request are enclosed by the dashed-lined box 210. While the method 200 may be performed for each page request, the acts within the box 210 are performed for each request associated with a particular page request. The method 200 may, but need not, be performed post process, after the request has already been loaded.

Specifically, for each request associated with the particular page request, the system monitors the requests by first receiving the request (act 211), satisfying the request (act 212), and then determining an interval associated with the request (act 213). In one embodiment, the interval is determined to be the time frame that begins with the time that the request was received, and that ends with the time that the request was satisfied. Referring to FIG. 3, the system 300 includes a receiver component 301 that receives the request, and an interval determination component 302 that determines the interval associated with the request once the request is satisfied.

Figure 4:
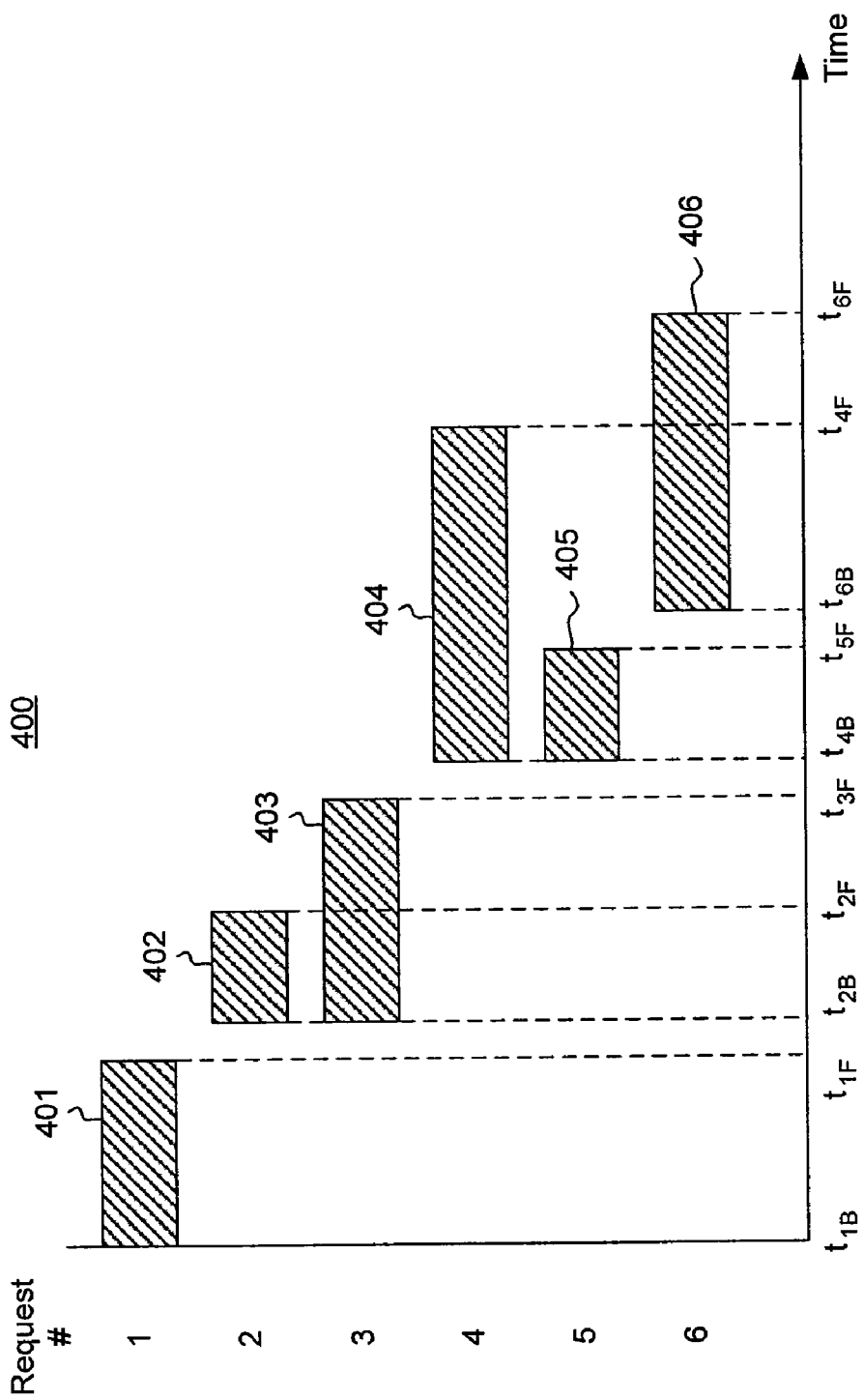
FIG. 4 illustrates an example interval set created from an example page load.

Given that the acts within the box 210 are performed for each request associated with a particular page request, the result provided to act 214 would be multiple intervals. The nature of this interval set will differ depending on the particularities of the process associated with the page loading operation. Nevertheless, FIG. 4 is provided as an example only, and is provided recognizing that a specific example can be helpful in understanding broader principles. Thus, although the principles described herein may apply to any page loading operation, FIG. 4 is provided merely as an example for illustration purposes only.

In FIG. 4, there are six intervals 401 through 406 corresponding to six requests #1 through #6 associated with a particular page request. Each interval has a beginning time and an end time. For instance, interval 401 associated with request #1 begins at time $t_{1B}$ and ends at time $t_{1F}$. Interval 402 associated with request #2 begins at time $t_{2B}$ (which is just after the time that the interval associated with request #1 ended) and ends at time $t_{2F}$. Interval 403 associated with request #3 also begins at time $t_{2B}$ but ends at time $t_{3F}$ (which is later than the time that the interval associated with request #2 ended). Interval 404 associated with request #4 begins at time $t_{4B}$ (which is just after the time that the interval associated with request #3 ended), and ends at time $t_{4F}$. Interval 405 associated with request #5 also begins at time $t_{4B}$, but ends at time $t_{5F}$ (which is actually earlier than the interval associated with request #4 ended). Interval 406 associated with request #6 begins at time $t_{6B}$ (which is just after the interval associated with request #5 ends, but before the interval associated with request #6 ends) and ends at time $t_{6F}$.

Referring back to FIG. 2, once the interval set is formulated (see the example of FIG. 4), the system formulates an acyclic directed graph based on the determined intervals (act 214). The parent node 501 of the acyclic graph is determined to be the first request associated with the page request. In this case, request #1 was begun and ended first, before any other request was initiated. Thus, request #1 is analyzed to represent the parent node 501.

To construct children nodes, several rules are observed. First, if an interval associated with a particular request begins before the interval for a reference request ends, the particular request is excluded from being a child request of the reference request. Second, if an interval associated with a particular request begins after multiple other reference intervals have ended, the particular request is determined to be the child of the request that is associated with the reference interval that ended most closely in time prior to the beginning of the interval of the particular request.

Figure 5:
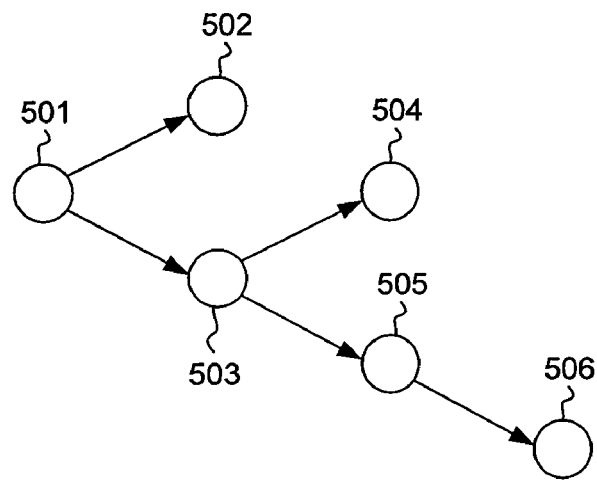
FIG. 5 illustrates an example acyclic directed graph that may be created from the example interval set of FIG. 4.

Thus, in this example, these rules will be applied to the interval set 400 of FIG. 4 to construct the acyclic directed graph 500 of FIG. 5. For instance, interval 401 is clearly the first interval in time, and thus the parent node 501 corresponds to the request #1.

As for interval 402, there is only one interval (i.e., interval 401) that ends prior to the interval 402 beginning. Accordingly, request #2 will be determined to be the child of request #1. Request #2 is not the child of any of requests #3 through #6 since interval 402 begins before any of intervals 403 through 406 end. Thus, node 502 (representing interval 402) in the directed graph 500 is represented as a child node of parent node 501.

Likewise, for interval 403, there is only one interval (i.e., interval 401) that ends prior to the interval 403 beginning. Accordingly, request #3 will also be determined to be the child of request #1. Request #3 is not the child of any of requests #2, #4, #5, or #6 since interval 403 begins before any of intervals 402, 404, 405, or 406 end. Thus, node 503 (representing interval 403) in the direct graph 500 is represented as a child node of parent node 501.

As for interval 404, there are three intervals (i.e., intervals 401, 402 and 403) that end prior to the interval beginning. However, interval 403 is the latest of such intervals to end. Accordingly, request #4 will be determined to be the child of request #3. Request #4 is not the child of any of requests #5 or #6 since intervals 405 and 406 end after interval 404 begins. Thus, node 504 (representing interval 404) in the directed graph 500 is represented as a child node of node 503.

As for interval 405, there are again three intervals (i.e., intervals 401, 402 and 403) that end prior to the interval beginning. However, interval 403 is the latest of such intervals to end. Accordingly, request #5 will also be determined to be the child of request #3. Request #5 is not the child of any of requests #4 or #6 since intervals 404 and 406 end after interval 405 begins. Thus, node 505 (representing interval 405) in the directed graph 500 is also represented as a child node of node 503.

As for interval 406, there are four intervals (i.e., intervals 401, 402, 403 and 405) that end prior to the interval beginning. However, interval 405 is the latest of such intervals to end. Accordingly, request #6 will be determined to be the child of request #5. Request #6 is not the child of requests #4 since interval 404 ends after interval 406 begins. Thus, node 506 (representing interval 406) in the directed graph 500 is represented as a child node of node 505.

The formulation of the acyclic directed graph 500 using the interval set 400 may have been accomplished by the graphing component 303 of FIG. 3. The example of FIGS. 4 and 5 is a relatively simple example to avoid unnecessarily complicating this description. However, the principles may be extended to apply to any arbitrarily large interval sets, such as 10 or more, 20 or more, or 50 or more intervals. At this point, the system 500 might simply notify the user of the acyclic directed graph (act 216). However, not all users are fully able to analyze an acyclic directed graph to determine how to improve page loading operations. Accordingly, the system itself may analyze the acyclic directed graph to thereby determine a critical path request of the plurality of requests (act 215). For instance, request #4 takes a long time to load. However, it is not a critical request path since improvement to the response time for request #4 will shorten interval 404, but will not reduce the overall page load time. However, request #6 also takes a long time to load. Request #6 is a critical request path since improvement to the response time for request #6 will not only shorten the interval 406, but will also shorten the page load time. This analysis may be performed by, for example, the analysis component 304 of FIG. 3. The notification component 305 may then notify the user of the request whose response time could be shortened (act 216).

As previously mentioned, the method 200 may be performed for multiple page loads. Accordingly, there may not only be the currently formulated acyclic directed graph, but there might also be prior acyclic directed graphs constructed from prior page loads. A trending module 306 (see FIG. 3) may be used to compare the current acyclic directed graph with acyclic graphs formulated from prior page requests. If a trend tends to show degradation in the response time for a particular response associated with the page load requests, then that degradation could be reported.

Figure 6:
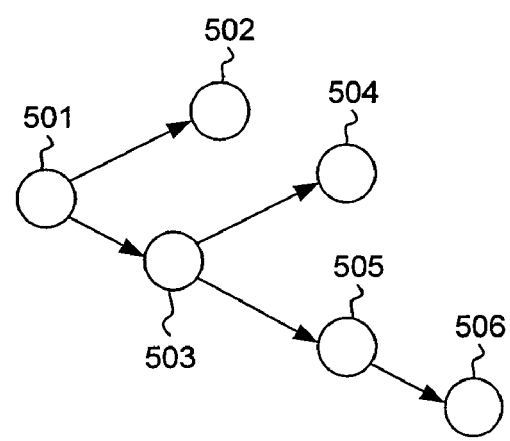
FIG. 6 illustrates an example acyclic directed graph that represents a variation of the graph of FIG. 5.

For instance, suppose that FIG. 6 represents a prior acyclic directed graph constructed in response to a prior page load request for the same web page. Comparing FIGS. 5 and 6, it can be concluded that the amount of time to respond to request #3 has increased. Likewise, the amount of time to respond to request #6 has also increased. Accordingly, the user might be notified that the response times for requests #3 and request #6 has deteriorated.

The user might then use this information to diagnose any problems with responding to request #3 or request #6 to thereby once again improve the overall page load time. For instance, the user might determine that some lock-contention might be causing a slow-down in the response for request #3. The user might then install a memory management module that resolves the lock contention. The user might also discover that insufficient server resources are slowing response time for request #6. Thus, the user might add servers for the purpose of responding to future requests for the type of resources requested by request #6.

Thus, an efficient mechanism for measuring and analyzing page load time has been described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprised of a computer-readable memory having thereon computer-executable instructions that, when executed by one or more processors, cause a computing system to perform a method for analyzing page load time, and wherein the method is comprised of the following acts:
    at a computing system, requesting a page that is to be loaded;
    monitoring at the computing system a plurality of requests associated with the requested page, the plurality of requests providing content and format for populating the requested page;
    determining at the computing system an interval that represents the time required to fulfill each of the plurality of requests associated with populating the requested page, the intervals for each of the requests associated with populating the requested page defining an interval set;
    using the interval set, formulating at the computing system an acyclic directed graph based on the determined intervals of the interval set, the graph comprising a corresponding node for each request associated with populating the requested page, and the nodes being hierarchically related to one another to define parent-child relationships between nodes, and distances between nodes representing intervals of the interval set; and
    using the graph to determine one or more potential requests associated with populating the requested page which are candidates for modification in order to shorten one or more intervals of the interval set when downloading the requested page.

2. The computer program product in accordance with claim 1, wherein the one or more computer-executable instructions cause the computing system to further perform the following:
    an act of analyzing the acyclic directed graph to determine a critical path of the interval set, in which each request in the critical path has an interval that affects overall download time of the requested page.

3. The computer program product in accordance with claim 2, wherein the one or more computer-executable instructions cause the computing system to further perform the following:
    an act of notifying a user of the determined critical path.

4. The computer program product in accordance with claim 2, wherein the one or more computer-executable instructions cause the computing system to further perform the following:
    an act of comparing the acyclic directed graph with acyclic graphs formulated from prior page requests.

5. The computer program product in accordance with claim 4, wherein the one or more computer-executable instructions cause the computing system to further perform the following:
    an act of detecting that a response time for the determined critical path request has deteriorated for the current page request compared to the prior page requests.

6. The computer program product in accordance with claim 1, wherein the one or more computer-executable instructions cause the computing system to further perform the following:
    an act of notifying a user of the formulated acyclic directed graph.

7. The computer program product in accordance with claim 1, wherein the acyclic directed graph includes at least 5 nodes.

8. A computer-implemented method for analyzing page load time, and wherein the method is comprised of the following acts performed by a computing system:
    (1) requesting a page that is to be loaded;
    (2) monitoring a plurality of requests associated with the requested page, the plurality of requests providing content and format for populating the requested page;
    (3) determining an interval that represents the time required to fulfill each of the plurality of requests associated with populating the requested page, the intervals for each of the requests associated with populating the requested page defining an interval set;
    (4) using the interval set, formulating an acyclic directed graph based on the determined intervals of the interval set, the graph comprising a corresponding node for each request associated with populating the requested page, and the nodes being hierarchically related to one another to define parent-child relationships between nodes, and distances between nodes representing intervals of the interval set;
    (5) using the graph to determine one or more potential requests associated with populating the requested page which are candidates for modification in order to shorten one or more intervals of the interval set when downloading the requested page;
    (6) modifying at least one of the candidates for modification in order to shorten at least one interval of the interval set; and
    (7) re-requesting the page and then using the acts (2) through (5), re-analyzing the load time for the page.

9. The computer-implemented method in accordance with claim 8, wherein the method is further comprised of:
    analyzing the acyclic directed graph to determine a critical path of the interval set, in which each request in the critical path has an interval that affects overall download time of the requested page.

10. The computer-implemented method in accordance with claim 9, wherein the method is further comprised of:
    notifying a user of the determined critical path.

11. The computer-implemented method in accordance with claim 9, wherein the method is further comprised of:
    comparing the acyclic directed graph with acyclic graphs formulated from two or more prior page requests.

12. The computer-implemented method in accordance with claim 11, wherein the method is further comprised of detecting when a response time for the determined critical path has deteriorated for the current page request compared to the prior page requests.

13. The computer-implemented method in accordance with claim 9, wherein the method is further comprised of:
    notifying a user of the formulated acyclic directed graph.

14. The computer-implemented method in accordance with claim 8 wherein the acyclic directed graph includes at least 10 nodes.

15. The computer-implemented method in accordance with claim 8, wherein the acyclic directed graph includes at least 20 nodes.

16. A computer program product comprised of a computer-readable memory having thereon computer-executable instructions that, when executed by one or more processors, cause a computing system to perform a method for analyzing page load time, and wherein the method is comprised of the following acts performed by the computing system:
  (1) requesting a page that is to be loaded;
  (2) monitoring a plurality of requests associated with the requested page, the plurality of requests providing content and format for populating the requested page;
  (3) determining an interval that represents the time required to fulfill each of the plurality of requests associated with populating the requested page, the intervals for each of the requests associated with populating the requested page defining an interval set;
  (4) using the interval set, formulating an acyclic directed graph based on the determined intervals of the interval set, the graph comprising a corresponding node for each request associated with populating the requested page, and the nodes being hierarchically related to one another to define parent-child relationships between nodes, and distances between nodes representing intervals of the interval set;
  (5) using the graph to determine a critical path comprised of requests associated with populating the requested page which are candidates for modification in order to shorten one or more intervals of the interval set and which will also shorten overall load time for the requested pate when downloading the requested page;
  (6) modifying at least one of the candidates for modification in order to shorten at least one interval of the interval set; and
  (7) re-requesting the page and then using the acts (2) through (5), re-analyzing the load time for the page.

17. The computer-program product in accordance with claim 16, wherein the one or more computer-executable instructions cause the computing system to further perform the following:
  an act of comparing the acyclic directed graph with acyclic graphs formulated from two or more prior page requests.

18. The computer-program product in accordance with claim 17, wherein the one or more computer-executable instructions cause the computing system to further perform the following:
  an act of detecting that a response time for the determined critical path has deteriorated for the current page request compared to one or more prior page requests.

19. The computer-program product in accordance with claim 16, wherein the one or more computer-executable instructions cause the computing system to further perform the following:
  an act of notifying a user of the formulated acyclic directed graph.

20. The computer-program product in accordance with claim 16, wherein the acyclic directed graph includes at least 50 nodes.

* * * * *